United States Patent [19]

MacKay

[11] Patent Number: 5,393,613
[45] Date of Patent: Feb. 28, 1995

[54] COMPOSITION FOR THREE-DIMENSIONAL METAL FABRICATION USING A LASER

[75] Inventor: Colin A. MacKay, Austin, Tex.

[73] Assignee: Microelectronics and Computer Technology Corporation, Austin, Tex.

[21] Appl. No.: 162,490

[22] Filed: Dec. 3, 1993

Related U.S. Application Data

[62] Division of Ser. No. 813,960, Dec. 24, 1991, Pat. No. 5,314,003.

[51] Int. Cl.$^6$ ............................................. B22F 7/00
[52] U.S. Cl. ................................. 428/553; 428/560; 419/47
[58] Field of Search .................. 75/255, 252; 428/553, 428/560; 419/47

[56] References Cited

U.S. PATENT DOCUMENTS

| | | | |
|---|---|---|---|
| 4,117,302 | 9/1978 | Earle et al. | 219/121 LM |
| 4,269,868 | 5/1981 | Livsey | 427/53.1 |
| 4,300,474 | 11/1981 | Livsey | 18/641 |
| 4,323,756 | 4/1982 | Brown et al. | 219/121 LF |
| 4,474,861 | 10/1984 | Ecer | 428/614 |
| 4,627,148 | 12/1986 | Imahashi et al. | 29/516 |
| 4,675,065 | 6/1987 | Gordon | 156/272.8 |
| 4,724,472 | 2/1988 | Sugimoto et al. | 357/74 |
| 4,746,390 | 5/1988 | Badalec et al. | 156/272.8 |
| 4,810,525 | 3/1989 | Morita et al. | 427/53.1 |
| 4,818,562 | 4/1989 | Arcella et al. | 427/53.1 |
| 4,845,335 | 7/1989 | Andrews et al. | 219/121.63 |
| 4,861,407 | 8/1989 | Volkmann et al. | 156/272.8 |
| 4,863,538 | 9/1989 | Deckard | 156/62.2 |
| 4,938,816 | 7/1990 | Beaman et al. | 156/62.2 |
| 4,944,817 | 7/1990 | Bourell et al. | 156/62.2 |
| 5,053,195 | 10/1991 | MacKay | 420/55 |
| 5,124,175 | 6/1992 | Miracky et al. | 427/98 |
| 5,147,587 | 9/1992 | Marcus et al. | 264/22 |
| 5,155,324 | 10/1992 | Deckard et al. | 219/121.63 |
| 5,156,697 | 10/1992 | Bourell et al. | 156/62.2 |
| 5,170,930 | 12/1992 | Dolbear et al. | 228/123 |

OTHER PUBLICATIONS

Colin A. Mackay, "Solder Creams And How To Use Them", reprint from Electronic Packaging & Production, Feb. 1981.

Colin A. Mackay, "Some Causes Of Problems With Existing SMT Solder Creams And Possible Improvements", IEPS 6th Annual Conference, pp. 157–167, Nov. 1986.

Colin A. Mackay, "Using Statistical Methods To Evaluate And Compare Screen Printing And Solder Cream Parameters", ASM International, 2nd Ann. Microelectronic Packaging, pp. 295–303, Apr. 1989.

Carl R. Deckard, "Part Generation By Layerwise Selective Sintering", Thesis presented to the Faculty of the Graduate School of The University of Texas at Austin in Partial Fulfillment of the Requirements for the Degree of Master of Science in Mechanical Engineering, pp. 1–50, May 1986.

*Primary Examiner*—Donald P. Walsh
*Assistant Examiner*—John N. Greaves
*Attorney, Agent, or Firm*—Johnson & Wortley

[57] ABSTRACT

Direct fabrication of three-dimensional metal parts by irradiating a thin layer of a mixture of metal powder and temperature equalization and unification vehicle to melt the metal powder and form a solid metal film. The vehicle also protects the molten metal from oxidation. The metal powder can contain an elemental metal or several metals, the vehicle can be an organic resin or an amalgam, and the irradiation can be selectively applied by a YAG laser.

18 Claims, 2 Drawing Sheets

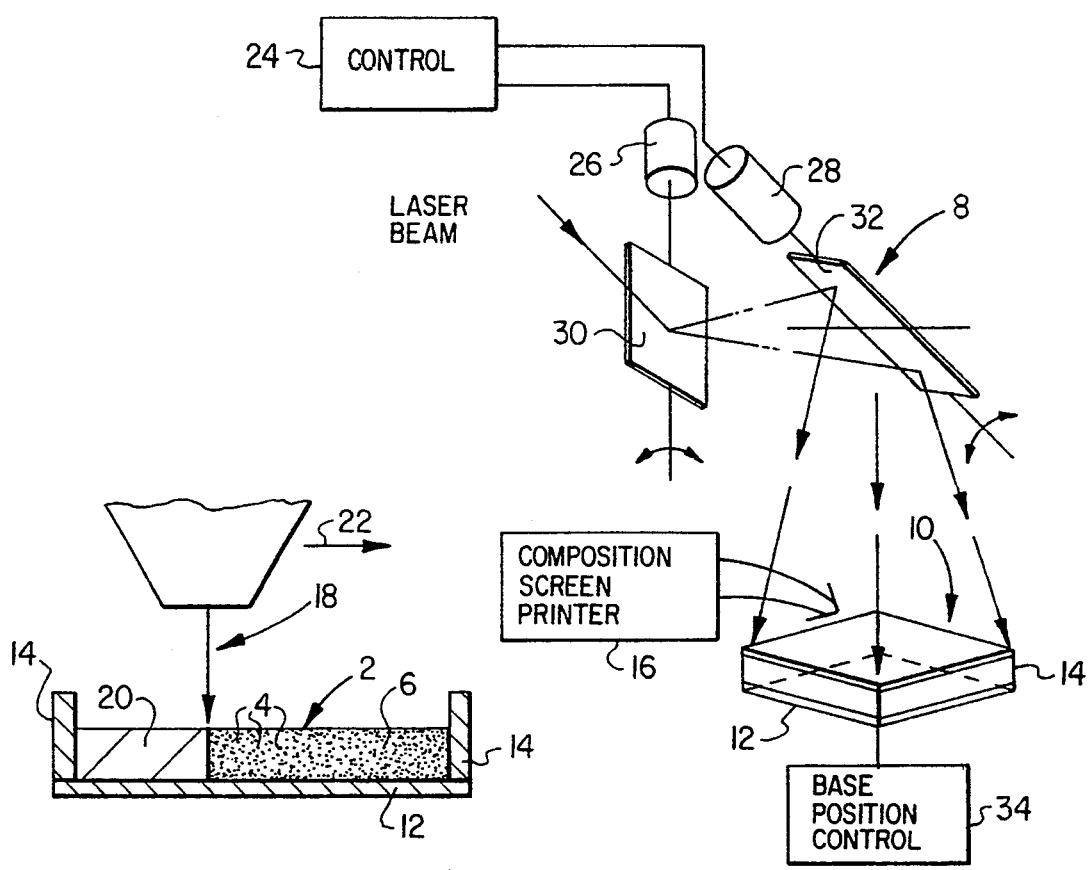
FIG. 1
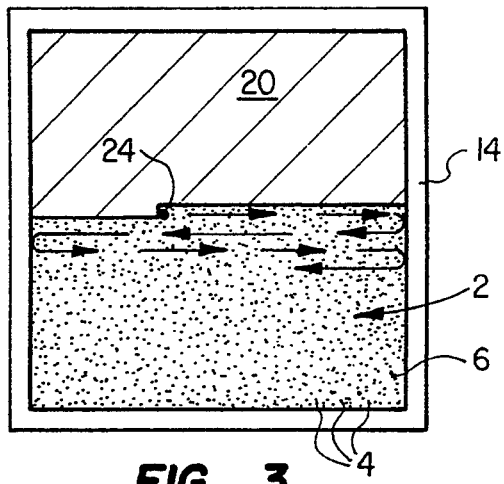
FIG. 2
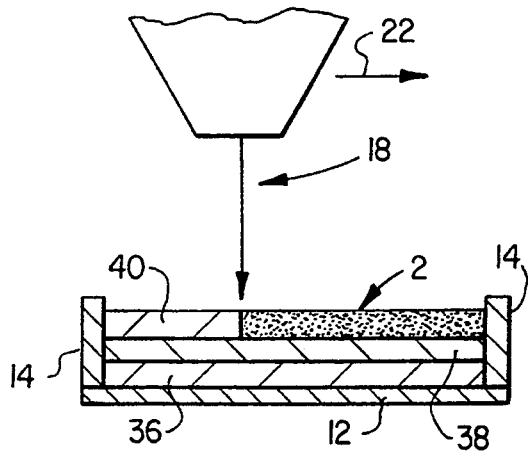
FIG. 3
FIG. 4

COMPOSITION FOR THREE-DIMENSIONAL METAL FABRICATION USING A LASER

This is a division of application Ser. No. 07/813,960, filed Dec. 24, 1991, now U.S. Pat. No. 5,314,003.

BACKGROUND OF THE INVENTION

1. Field of the Invention

The present invention relates to methods, apparatus and compositions for making metal objects. More particularly, the present invention relates to methods, apparatus and compositions for making three-dimensional metal parts by irradiating a mixture of metal powder and a vehicle which provides temperature equalization and unification and a protective atmosphere for the powder.

2. Description of Related Art

Because conventional casting and extrusion techniques often cannot efficiently and cost-effectively be employed to produce prototypes or small runs of parts, those skilled in the parts production art have sought to develop techniques better suited for such purposes. In general, the techniques developed by those skilled in the art to produce small numbers of parts can be classified in one of two separate categories, each of which is discussed below.

The first category comprises "subtractive methods". In a subtractive method, material is cut away from a starting piece of material to create a smaller, desired piece. Examples of subtractive machine tool methods include milling, drilling, grinding, lathe cutting, casting, machining, finishing and flame cutting.

The second category of techniques that may be employed to produce small runs of parts comprises "additive methods". Typically, additive methods involve adding material to a starting substrate to create a larger, desired piece. Examples of additive methods include plating, cladding, casting and certain welding processes.

Both of the aforementioned categories of techniques for producing small runs of parts have deficiencies and shortcomings. Deficiencies and shortcomings of subtractive methods are well known and have heretofore been expressed at some length, such as in the description of the relevant art section of U.S. Pat. No. 4,938,816 to Beaman et al. These deficiencies and shortcomings include the facts that they produce a large amount of waste material requiring disposal, they involve a large initial expense for setting up the proper machining and tools, and they involve tool wear that requires tool replacement and which reduces machining accuracy as the tool wears. Further, subtractive methods often simply cannot be employed to make a desired part. Symmetrical parts and parts where only the exterior of the part is to be machined can usually be easily produced by a subtractive method; however, where a desired part is asymmetrically shaped or requires internal machining, a part must often be broken into segments, which requires labor intensive assembly and bonding stages, in order for subtractive methods to be readily employed.

With respect to additive methods, a primary shortcoming and deficiency heretofore has been a general inability to produce a small, solid object. There has been, however, some recent activity directed towards overcoming this primary shortcoming and deficiency. In general, those skilled in the art have made efforts to use laser beams to coat or deposit material on a starting article. Such efforts are articulated in, e.g., U.S. Pat. Nos. 4,117,302, 4,474,861, 4,300,474 and 4,323,756. These relatively recent uses of lasers have been basically limited to adding a coating to a previous machined article. Typically, in such laser coating methods the starting article is rotated and the laser directed at a fixed location with the coating material sprayed onto the article so that the laser will melt the coating onto the article.

Still further with respect to additive methods of producing prototypes and small runs of parts, very recently certain persons skilled in the art have devised a method for building up parts from a powder by selectively sintering with a laser. The objective of this method has been to produce three-dimensional parts of a general shape directly from a CAD data base without part-specific tooling or human intervention. This method is described at length in U.S. Pat. Nos. 4,863,538, 4,938,816 and 4,944,817. Although the basic theory of this method appears to be sound, in practice this method has a number of serious shortcomings. For example, as powders are melted in air during practice of this method, there is little control over those powders and they tend to fly away uncontrolled and severly oxidized. Second, control of melting is relatively unrefined so that rough outlined shapes, rather than sharply defined shapes, are produced. Additionally, this method lacks refinements that make producing of metal parts, perhaps the most useful types of parts, practical. In summary, although this latter method of creating prototypes and small runs of parts has much promise, it has many shortcomings and deficiencies that render it yet relatively useless for certain applications, e.g., applications involving production of solid metal parts.

SUMMARY OF THE INVENTION

The present invention overcomes the shortcomings and deficiencies of the prior art by providing a composition, method, and apparatus especially well suited for producing three-dimensional metal parts by irradiating a metal powder in a protective atmosphere, temperature equalization and unification vehicle or carrier medium provided for the powder. This vehicle controls the metal powder in a variety of ways. For example, the vehicle provides a protective atmosphere for the metal powder which protects the powder, once melted, from oxidation by the atmosphere. The vehicle also keeps the metal powder from flying away during practice of the method of the present invention. As another example, the vehicle controls temperatures during practice of the method of the present invention to ensure metal particles are maintained liquid so that adjacent melted particles can solidify together. Still further, the vehicle facilitates formation of thin continuous layers of metal powder for irradiation. In summary, the present invention, by having certain aspects, such as a temperature equalization and unification vehicle, overcomes shortcomings and deficiencies of the prior art that have heretofore prevented formation of high quality metal prototypes and the like.

More specifically, the present invention provides a material or composition for direct fabrication of three-dimensional parts in metal. This material or composition includes a metal powder mixed with a temperature equalization and unification vehicle. When a thin layer of the mixture is irradiated by a laser the metal powder melts and forms a metal film.

In embodiments of the present invention the metal powder comprises a variety of different metal particles designed to form a desired alloy when they melt upon irradiation.

In certain specific embodiments of the present invention the metal powder includes copper particles and solder particles in a resin cream similar to that used for solder creams. Such solder particles can include tin and lead.

The present invention also provides a method for forming three-dimensional metal parts. This method includes the steps of obtaining a mixture of metal powder in a temperature equalization and unification vehicle, forming a thin layer of the mixture, and irradiating the thin layer with a laser to define a specific shape or outline as driven by a software program so that the metal powder in the thin layer solidifies into a metal film having said shape. In embodiments of the present invention, parts may be made by forming one metal film layer on top of another. Also according to the teachings of the present invention, different compositions or mixtures may be used to form different types of metal films within a single piece.

In embodiments of the method of the present invention, screen printing or application with a "doctor knife" or "doctor bar" may be employed to form the thin layers of metal powder in a vehicle. Also, in one specific embodiment of the method of the present invention heretofore practiced, the mixture of metal powder comprised copper particles, the temperature equalization and unification vehicle comprised a resin cream containing tin and lead, and the irradiation was effected by a YAG laser.

Still further, the present invention provides an apparatus for forming metal articles. This apparatus includes means for containing a mixture of metal powder in a temperature equalization and unification vehicle, means for forming thin layers of the mixture within the means for containing, and means for irradiating the thin layers to melt the metal powder and form a metal film.

Accordingly, it is an object of the present invention to provide a composition suitable for directly fabricating three-dimensional parts in metal by patterning with a laser.

Another object of the present invention is to make prototype parts from a mixture of powder and vehicle by melting the powder with a laser beam, "in situ", cross-sectional layer by layer until a complete, desired shape is formed.

Yet another object of the present invention is to provide a method for fabricating metal parts that readily allows for different layers to be included within the parts.

BRIEF DESCRIPTION OF THE DRAWINGS

For a more complete understanding of the present invention, and for further objects and advantages thereof, reference may now be had to the following description taken in conjunction with the accompanying drawings in which:

FIG. 1 is a schematic perspective view of an apparatus according to the teachings of the present invention;

FIG. 2 is a cross-sectional view of a portion of the apparatus of FIG. 1 during operation;

FIG. 3 is a top view of a portion of the apparatus of FIG. 1 during operation;

FIG. 4 is also a cross sectional view of a portion of the apparatus of FIG. 1 during operation;

DETAILED DESCRIPTION OF THE INVENTION

Figure 5:
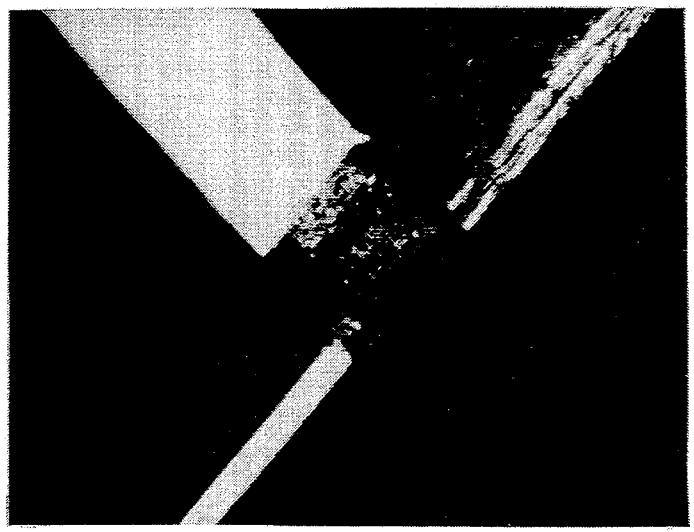
FIG. 5 is an optical micrograph of an article formed by practice of the method according to the teachings of the present invention.

Referring now to the drawings which are not necessarily drawn to scale and wherein like or similar elements are designated with the same reference numerals throughout the several views, and more particularly to FIG. 2, shown therein is a composition 2 according to the teachings of the present invention. As mentioned in the summary of the invention section above, composition 2 is designed and especially well suited for direct fabrication of three-dimensional metal parts using a laser.

Composition 2 comprises metal powder 4 in a temperature equalization and unification vehicle 6. The presence of the vehicle 6 is, as mentioned in the summary of invention section above, an essential aspect of the present invention. Powders have heretofore been irradiated by a laser in air, yielding relatively poor results in three-dimensional object production applications, but astounding results in those very same applications may be obtained by using a temperature equalization and unification vehicle as taught herein.

Temperature equalization and unification vehicle 6 may comprise any number of substances that interact with metal powder 4 suspended therein in a desired way when irradiated. Such desired interaction comprises ensuring a melted particle remains liquid until it can combine and solidify with a nearby melted particle. That is, vehicle 6 should perform a temperature equalization and unification process in the area of particles being melted via irradiation. At the same time, the vehicle 6 itself should react very rapidly to heat so as to speed the melting process. The desired interaction between the vehicle 6 and the metal particles or powder 4 also comprises the vehicle 6 providing a protective atmosphere for the metal particles or powder 4. That is, the vehicle 6 should protect the melted particles 4 from oxidation by the atmosphere. Sodium, potassium, calcium, carbonates, silicates, aluminium and combinations thereof are particularly well suited for vehicle 6 when metal powder 4 has a melting point above 400° C. (e.g., steel at 900° C.). Alternatively, organic resins are particularly well suited as vehicle 6 when the metal powder has a melting point less than or equal to 400° C. For example, the organic resin may comprise a rosin (such as water white or tall oil) with dimer and trimer variants of said rosin at the 0.3 percent level as rheological control additives so that the mixture is dissolved in a solvent such as butyl carbitol or isobutyl alcohol to produce a 55 percent volume mixture. Vehicle 6 may also be an amalgam such as described in U.S. Pat. No. 5,053,195 which is incorporated by reference into this document. A preferred composition 2 with an amalgam vehicle 6 comprises copper, nickel and gallium. In addition, vehicle 6 can be a resin cream containing tin and lead particles.

The powder 4 may consist of particles of a single metal, such as copper, or powder 4 may comprise a mixture of several different metals or even an alloy powder (that is, powder made from alloys). Along this line, it should be recognized that the present invention has advantages over the prior art. These advantages relate again to the presence of vehicle 6. As the prior art lacks a vehicle 6 (other than air), that is, as the prior art lacks effective temperature equalization and unification means, melting in situ via prior art methods is effectively confined to alloying of alloy powder. In operation of apparatus and methods according to the teachings of the present invention, on the other hand, elemental metal powders or mixtures thereof can readily be used because they can be rendered molten. Not having to use alloy powder generally reduces costs and increases flexibility insofar as a wide selection of different metal films can be quickly produced.

Referring now to FIG. 1, shown therein is a schematic perspective view of an apparatus 8 according to the teachings of the present invention. This apparatus 8 comprises means for containing a composition 2 according to the teachings of the present invention, means for forming thin layers of that composition, and means for irradiating the thin layers to melt the metal powder and form a metal film. Each of these elements is discussed in an individual paragraph immediately below.

The means for containing the composition may be any manner of container 10 capable of holding the composition 2 both before irradiation and after irradiation when the vehicle 6 is dissipated and the metal powder 4 cools to form a continuous unoxidized solid metal film. In the various FIGS., the container 10 is shown as comprising a base 12 and separate walls 14. Of course, a unitary container could also be used. A wide variety of other conventional means for containing could also be used provided the means possesses sufficient strength under irradiation temperature conditions to contain the composition and metal film.

An apparatus according to the teachings of the present invention also includes means for forming thin layers of the composition according to the teachings of the present invention. In FIG. 1, this means should be in block form to be a screen printer 16. A screen printer includes a screen onto which composition may be disposed and it further includes means for pressing the screen on a substrate to impart a thin layer of the composition thereon. Of course, mere pouring and/or spreading of the composition in the bottom of a container or any of a multitude of any other methods for forming thin layers could be employed in practicing the method of the present invention.

As previously mentioned, an apparatus according to the teachings of the present invention also includes means for irradiating the thin layers of composition to melt the metal powder and form a metal film. This transformation from composition to metal film is shown in FIGS. 2, 3 and 4. In FIG. 2, a laser beam 18 is shown to impinge upon the interface between some of the composition 2 and a film 20 previously formed by irradiation of that composition 2. As indicated by arrow 22, the laser beam 18 is moving so as to continue the process of melting the metal powder 4 in the composition 2 to form metal film 20. Metal film 20 does not normally contain any vehicle 6 unless vehicle 6 comprises an amalgam. That is, the irradiation causes the non-amalgam vehicles to move outside metal film and to become incorporated into the non-irradiated composition. On the other hand, an amalgam vehicle 6 to some degree becomes part of the solidified metal film 20, depending on the solubility of composition 2. For example, a composition with iron powder would exhibit low solubility, whereas a composition with copper or nickel powder would have high solubility and incorporate virtually all of the amalgam vehicle in the irradiated regions into the metal film. Furthermore, thick and thin distributions of metal powder 4 can result in thick and thin regions of metal film 20, respectively. This same process from a different angle is shown in FIG. 3. There, viewed from the top, the laser beam 18 impinges at a point 24. The laser beam 18 is moving back and forth and down composition 2 to form a metal film 20 as it passes. FIG. 4 shows a view of this process similar to FIG. 2, but different in that two layers of film underlie the layer being operated upon. The significance of these two layers is explained in greater detail below.

As should be clear, after the metal film 20 cools and solidifies it is generally desirable to remove the non-irradiated composition 2 and any vehicle 6 incorporated into composition 2 to provide a free-standing three-dimensional metal film 20. The removal step can be performed by dunking the non-irradiated composition 2 into a solution. The preferred solution depends on the vehicle employed. For instance, isopropyl alcohol is the preferred solvent for removing organic resin vehicles. However, warm water is preferred for removing vehicles such as sodium, potassium, calcium, carbonates, silicates, aluminium and combinations thereof.

Still further with respect to the means for irradiating included within the apparatus according to the teachings of the present invention, this means can be effectively provided by a laser. Other means of irradiating and raising the temperature of the composition so as to cause melting and formation of a desired final film may be employed, however, and are encompassed within the scope of the present invention. Such other means include a focused electron beam and a solar furnace.

An apparatus according to the teachings of the present invention has heretofore been constructed and operated with remarkable results. Specifically, efforts were undertaken to form a solid shape in bronze. For this purpose a composition comprising of about 9.5 grams of 63/37 Sn/Pb solder alloy cream was mixed with several grams of copper powder. This composition was then spread thinly onto a gold coated wafer to serve as a substrate or means for containing. A yttrium aluminum garnet (YAG=$Y_3Al_5O_2$) laser was then used to irradiate the thin layer of composition. At a power level of about 50 watts, alloying of the various elements within the composition to produce bronze proceeded well.

The experiment continued by programming a square profile involving slightly displaced square traces into the laser control (element 24 in FIG. 1). Then, an approximately 3 mil thick layer of the composition was deposited over the surface. For convenience, fiduciary reference marks were burned into the gold layer approximately one inch outside the square pattern. The square profile was then run. Another layer of composition was then spread over the square outline. The fiduciaries were realigned and the outline patterned in the fresh paste. Yet another layer of composition was spread over the surface, the fiduciaries realigned and the patterning continued. Repetition of the process for about ten cycles gave a hollow square preform ⅛ inch thick.

Figure 6:
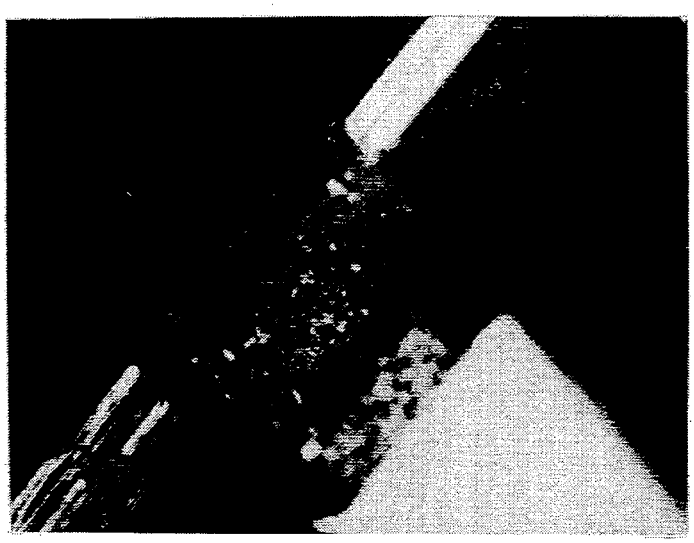
FIG. 6 is another optical micrograph of an article formed by practice of the method according to the teachings of the present invention.

Examination of the preform showed apparently full alloying of the copper with the solder to yield a bronze alloy. Some extraneous solder and copper particles were adhering to the shape. These were removed by ultrasonic cleaning with isopropyl alcohol (a.k.a. IPA, a solvent for the paste vehicle). The integrity of the shape obtained is indicated by the optical microphotographs shown in FIGS. 5 and 6.

Referring now again to FIG. 1, it should be appreciated that practice of the method of the present invention (by, e.g., the apparatus of the present invention) involves moving a laser beam; or rather, such practice involves movement of a target and beam relative to each other. This movement can involve moving the target, moving the beam, or both. FIG.1 shows a combination moving means. The system shown in FIG. 1 includes a galvanometric laser beam steering system including galvanometers 26, 28 and rotatable mirrors 30, 32 to move the laser beam itself. Further details regarding this system can be found in U.S. Pat. No. 4,845,335. Those details are hereby incorporated by reference into this document. The system shown in FIG. 1 also includes a base position control mechanism 34, i.e., a conventional mechanical mechanism for raising or lowering the means for containing. The purpose of this mechanism is discussed immediately below.

An aspect of the present invention that makes it extremely flexible is the fact that because articles are made layer by layer, it is an easy matter to vary layers within an article. For example, in FIG. 4 it should be understood that film layer 36 was first formed. Then, with a different composition from that used to form film layer 36, a film layer 38, different from film layer 36 was formed. Furthermore, when metal films 36 and 38 are molten, vehicle 6 protects metal films 36 and 38 from oxidizing. That is, the vehicle for underlying metal film 36 protects film 36 again when film 36 is rendered molten as film 38 is formed thereon and interconnected thereto. Finally, FIG. 4 shows a third film layer 40 identical to the bottom film layer 36 being formed. This aspect can be useful when, for example, a conductive layer is desired to be placed between relatively unconductive layers. As another example, surface layers (i.e., the top and bottom-most layers) can be surface hardened, or made harder than layers in between them. Further, complex hollow and internally reinforced shapes are possible by continuously varying the shape of each successive layer. Other such possibilities should readily suggest themselves to persons skilled in the art. The ease with which such different layers can be made during practice of the present invention may be a significant and important benefit of the present invention in certain applications. Referring back to the control 34 in FIG. 1, this control 34 can be operated to lower the means for containing 10 as different layers of an object are built up.

Based upon the foregoing, those skilled in the art should now appreciate that the present invention provides a composition, method and apparatus for forming three-dimensional metal objects that overcomes a number of deficiencies and shortcomings of the prior art. As the present invention includes temperature equalization and unification means, control is facilitated. Also, the present invention is especially useful to create articles having various, different layers.

Obviously, numerous modifications and variations of the present invention are possible in view of the above teachings. Accordingly, within the scope of the appended claims, the present invention may be practiced otherwise than as specifically described herein.

What is claimed is:

1. A composition for three-dimensional metal fabrication, said composition comprising:
   metal powder, whereas said metal powder has a melting point above 400°; and
   a temperature equalization and unification vehicle mixed with said metal powder to form a mixture, wherein a thin layer of said mixture may be irradiated to melt the metal powder and form a metal film.

2. A composition as recited in claim 1, wherein said metal powder comprises a single metal.

3. A composition as recited in claim 1, wherein said metal powder comprises a plurality of metals.

4. A composition as recited in claim 1, wherein said metal powder comprises an alloy powder.

5. A composition as recited in claim 1, wherein said metal powder comprises copper particles and solder particles.

6. A composition as recited in claim 1, wherein said vehicle is selected from the group consisting of sodium, potassium, calcium, carbonates, silicates, aluminium and combinations thereof.

7. A composition as recited in claim 6, wherein said metal powder has a melting point above 900° C.

8. A composition as recited in claim 1, wherein said vehicle comprises a resin cream comprising tin and lead particles.

9. A composition as recited in claim 1, wherein said vehicle protects the molten metal from oxidation.

10. A composition as recited in claim 1, wherein said vehicle comprises an organic resin.

11. A composition as recited in claim 10, wherein said vehicle further comprises dimer and trimer variants of said resin as rheological control additives.

12. A composition as recited in claim 11, wherein said dimer and timer variants are at the 0.3 percent level and said mixture is dissolved in a solvent to produce a 55 percent volume mixture.

13. A composition as recited in claim 12, wherein said organic resin is selected from the group consisting of water white rosin and tall oil rosin.

14. A composition as recited in claim 12, wherein said solvent is selected from the group consisting of butyl carbitol and isobutyl alcohol.

15. A composition as recited in claim 1, wherein said vehicle is an amalgam and said metal film includes said amalgam.

16. A composition as recited in claim 15, wherein said mixture includes copper, nickel and gallium.

17. A composition as recited in claim 1, wherein said metal film is a continuous film which does not contain said vehicle.

18. A composition as recited in claim 1, wherein said mixture contains thick and thin distributions of said metal powder which result in thick and thin films, respectively.

* * * * *